United States Patent
Gennermann

(10) Patent No.: US 10,351,098 B2
(45) Date of Patent: Jul. 16, 2019

(54) METHOD FOR AUTHENTICATING A DRIVER IN A MOTOR VEHICLE

(71) Applicant: Huf Hülsbeck & Fürst GmbH & Co. KG, Velbert (DE)

(72) Inventor: Sven Gennermann, Velbert (DE)

(73) Assignee: Huf Hülsbeck & Fürst GmbH & Co. KG, Velbert (DE)

( * ) Notice: Subject to any disclaimer, the term of this patent is extended or adjusted under 35 U.S.C. 154(b) by 30 days.

(21) Appl. No.: 15/105,513

(22) PCT Filed: Dec. 17, 2014

(86) PCT No.: PCT/EP2014/078277
§ 371 (c)(1),
(2) Date: Jun. 16, 2016

(87) PCT Pub. No.: WO2015/091679
PCT Pub. Date: Jun. 25, 2015

(65) Prior Publication Data
US 2016/0311400 A1 Oct. 27, 2016

(30) Foreign Application Priority Data
Dec. 18, 2013 (DE) .......................... 10 2013 114 394

(51) Int. Cl.
B60R 25/20 (2013.01)
B60R 25/25 (2013.01)
B60R 25/30 (2013.01)

(52) U.S. Cl.
CPC .......... *B60R 25/2018* (2013.01); *B60R 25/25* (2013.01); *B60R 25/305* (2013.01); *B60R 2325/106* (2013.01); *B60R 2325/205* (2013.01)

(58) Field of Classification Search
None
See application file for complete search history.

(56) References Cited

U.S. PATENT DOCUMENTS 6,532,298 B1 * 3/2003 Cambier .............. A01K 11/006
340/5.82
6,727,800 B1 * 4/2004 Dutu ..................... B60R 25/252
123/179.1

(Continued)

FOREIGN PATENT DOCUMENTS

CN 1658643 A 8/2005
CN 101051399 A 10/2007

(Continued)

OTHER PUBLICATIONS

Office Action for related Chinese application No. 201480069925.X dated Jun. 16, 2017, with an English translation, 13 pages.

(Continued)

*Primary Examiner* — David P. Merlino
(74) *Attorney, Agent, or Firm* — Rudy J. Ng; Bret E. Field; Bozicevic, Field & Francis LLP

(57) ABSTRACT

The invention relates to a method for authenticating a driver (2) in a motor vehicle (1), having a detection device (10) which is arranged in the motor vehicle (1) and has the purpose of detecting actual data (50) of the driver (2) which is transmitted during the authentication to a checking device (20) which is arranged in an external station (3) outside the motor vehicle (1), wherein the checking device (20) compares the actual data (50) with setpoint data (60), and when the actual data (50) corresponds to the setpoint data (60) an enable signal (70) is transmitted from the external station (3) to the motor vehicle (1), as a result of which a starting process of the motor vehicle (1) for the driver (2) is made possible.

25 Claims, 3 Drawing Sheets

(56) References Cited

U.S. PATENT DOCUMENTS

Figure 1:
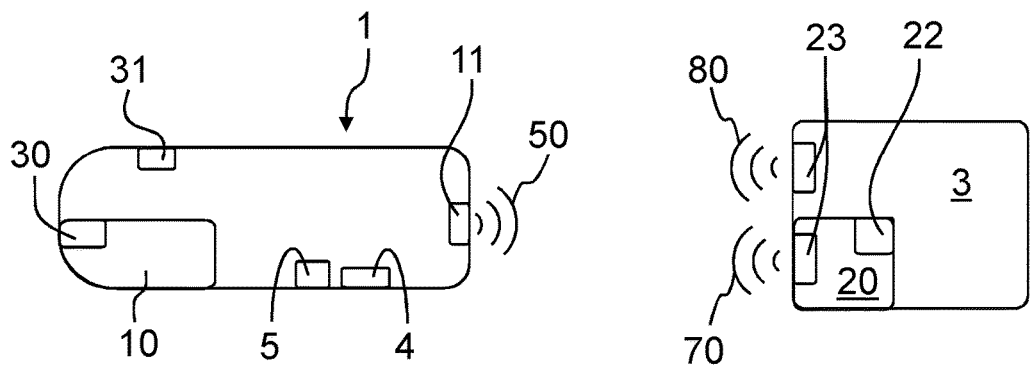

| | | | | |
|---|---|---|---|---|
| 7,171,293 | B2* | 1/2007 | Ichikawa | B60R 25/25 701/36 |
| 7,228,122 | B2* | 6/2007 | Oyagi | B60R 25/24 455/411 |
| 7,234,157 | B2* | 6/2007 | Childs | G06F 21/31 726/18 |
| 8,880,291 | B2* | 11/2014 | Hampiholi | B60R 25/25 701/1 |
| 2004/0124971 | A1* | 7/2004 | MacTavish | G07C 5/0816 340/425.5 |
| 2005/0206502 | A1* | 9/2005 | Bernitz | B60R 25/25 340/5.82 |
| 2006/0111822 | A1* | 5/2006 | Simon | B60R 25/102 701/468 |
| 2006/0215884 | A1* | 9/2006 | Ota | B60R 25/252 382/118 |
| 2007/0294746 | A1* | 12/2007 | Sasakura | B60R 25/25 726/2 |
| 2010/0148923 | A1* | 6/2010 | Takizawa | B60R 25/25 340/5.82 |
| 2010/0262668 | A1* | 10/2010 | Piett | H04W 4/22 709/206 |
| 2012/0112879 | A1* | 5/2012 | Ekchian | A61B 5/117 340/5.53 |
| 2012/0313796 | A1 | 12/2012 | Lee et al. | |
| 2013/0005414 | A1* | 1/2013 | Bindra | B60R 25/25 455/575.9 |
| 2013/0073114 | A1* | 3/2013 | Nemat-Nasser | B60W 40/09 701/1 |
| 2013/0099940 | A1* | 4/2013 | Protopapas | B60R 25/25 701/1 |
| 2014/0142805 | A1* | 5/2014 | Frye | B60R 16/023 701/36 |
| 2014/0278607 | A1* | 9/2014 | Johnson | B60R 25/24 705/5 |
| 2015/0161832 | A1* | 6/2015 | Esselink | B60R 25/24 340/5.22 |
| 2016/0021238 | A1* | 1/2016 | Abramson | H04W 48/04 455/418 |

FOREIGN PATENT DOCUMENTS

| | | | | |
|---|---|---|---|---|
| DE | 102004057746 A1 | 6/2005 | | |
| DE | 102006042358 A1 | 3/2008 | | |
| DE | 602006000078 T2 | 5/2008 | | |
| EP | 1634782 A2 | 3/2006 | | |
| EP | 2295298 A1 | 3/2011 | | |
| GB | 2373614 A | 9/2002 | | |
| GB | 2421623 A | * | 6/2006 | B60R 25/25 |
| WO | WO2014012762 A1 | 1/2014 | | |

OTHER PUBLICATIONS

Office Action for European Application No. 13732488.5 dated Mar. 14, 2019, with its English translation, 5 pages.

* cited by examiner

METHOD FOR AUTHENTICATING A DRIVER IN A MOTOR VEHICLE

The invention relates to a method for authenticating a driver in a motor vehicle. Further, the invention relates to a system which can be conducted with said method.

From the state of the art it is known to improve protective mechanisms against car theft or developed devices which only approve an authorized person to drive a motor vehicle particularly that only an authorized person can start a motor vehicle. A lot of different safety devices exist which only permit the ignition of a motor vehicle by a driver only after authentication of the biological information of the driver. Document DE 60 2006 000 078 T2 discloses a biometric authentication wherein the verification of the detected biometrical data of the driver occurs via a motor vehicle drive. A main disadvantage of this state of the art is that each motor vehicle has to be equipped with such a checking unit. Besides, the risk occurs that during the checking of the biometric data at the vehicle manipulations may occur.

The object of the present invention is to avoid said disadvantages, particularly to establish an efficient method for authentication of a driver in a motor vehicle wherein at the same time a reliable operating mode is ensured.

Said object is solved by a method with all features of claim 1. Advantageous embodiments of the invention are shown in the dependent claims. Further, the invention is solved by a system with features as described herein. Advantageous embodiments are indicated in the dependent claims.

According to the invention a method for authentication of a driver in a motor vehicle is proposed with a recognition device assembled within the vehicle for detecting actual data of the driver which are transmitted during the authentication to an reviewing device which is assembled in an external station outside the motor vehicle wherein the reviewing device compares the actual data with target data and with the conformity of the actual data and the target data an enabling signal is transmitted from the external station to the motor vehicle whereby an ignition procedure of the motor vehicle is enabled for the driver.

An essential matter of the invention is that actual data of the driver are detected within the motor vehicle via the recognition device. This means that the determination of the actual data of the driver occur only when the driver is within the vehicle particularly sits on the front seat of the vehicle. After a determination of this actual data a further step of the method according to the invention occurs namely that the detected actual data are transmitted to an external station wherein this external station is outside the motor vehicle. The external station spaced apart from the recognition device of the motor vehicle comprises a reviewing device which compares the actual data with the previously saved target data of the driver. In case the actual data are conform with the target data an enabling signal is send from the external station to the motor vehicle which receives the enabling signal whereby an ignition process of the motor vehicle is enabled for the driver. Besides, it is possible that a second reviewing device is assembled within the motor vehicle in which the target data are saved. These target data are sent from an external station to the motor vehicle. In case for example a communication between the external station and the motor vehicle is impossible an examination of the actual data with the target data occurs in the second reviewing device. If the actual data correspond to the target data in the second reviewing device an enabling signal for the motor vehicle is generated which receives the enabling signal whereby an ignition process of the vehicle is enabled for the driver.

Without enabling signal the driver cannot start the ignition process within the motor vehicle since this process is blocked or deactivated. Only with the positive authentication meaning conformity of the actual data and the target data an ignition process is enabled. Advantageously, the actual data are biometric actual data of the driver.

According to the invention it is possible that in case of a communication disorder between the external station and the motor vehicle a second reviewing device receives the actual data from the external station and compares the actual data with the target data and with a conformity of the actual data with the target data generates an enabling signal wherein the ignition process of the motor vehicle is enabled for the driver. Further, the invention comprises that the target data of the reviewing device of the external station are transmitted in constant time intervals to the second reviewing device particularly the actual data of the reviewing device of the external station are transmitted to the reviewing device of the vehicle related reviewing device during the authentication. Thereby, a regular comparison of the target data occurs between the reviewing device of the external station and the vehicle related reviewing device.

Advantageously, the target data can be memorized in the external station before authentication particularly a memorizing device is intended which detects the target data of the driver outside the motor vehicle which for example can be saved in the external station. The memorizing device can for example be a camera which detects image data of the authorized person which intends to start the motor vehicle. The memorizing device can in a further embodiment be configured in a way that visually and/or optically defined biometrical characteristics of the driver are recognized and are memorized and saved as target data.

Likewise, it is possible that a memorizing device is intended outside the motor vehicle which detects the target data of the driver. This memorizing device is in communication with an external station wherein the external station comprises the reviewing device which is responsible to compare the memorized target data with the actual data.

The invention further comprises the possibility that beneath the biometrical target data in the external station further information can be stored which can restrict or limit a possible ignition process of the motor vehicle. This means that a defined time frame, for example a defined day, month or hour etc., is provided for a person in order to release a positive ignition process of the motor vehicle.

Further, it is possible that as far as no conformity of the data exists the motor vehicle is in a safety mode in which an ignition of the motor vehicle is blocked wherein with conformity of the data the motor vehicle is in an ignition mode. For example, the ignition control of the motor vehicle can be deactivated in the safety mode in order to not permit an ignition of the motor vehicle for an unauthorized person. Only with a conformity of the data a mode switch of the vehicle occurs namely from the safety mode into the ignition mode. By a corresponding action of the driver for example by an insertion and/or turning of the ignition key of the motor vehicle lock intended within the motor vehicle the ignition of the motor vehicle engine occurs. Likewise, it is possible that a start-/stop switch is intended for activating the ignition of the motor vehicle engine.

In a further measure improving the invention can be intended that in the external station particularly in the reviewing device it is readable in how far the motor vehicle is in a safety mode or in an ignition mode.

Likewise, the method according to the invention can be integrated in a start-/stop system of a motor vehicle which is an automatically working system for the reduction of the fuel consumption in standing phases of motor vehicles, for example, during a stop at traffic lights. The start-/stop system works with an automatic engine shut-off. The method according to the invention can for example be integrated in a start-/stop system in a way that in case of an automatic engine shut-off and a subsequent automatic engine start an authentication of the driver fails to appear according to the idea of the invention in case previously a positive authentication has occurred.

According to the invention the method can comprise a control which initiates the authentication starting from at least one defined action of the driver. This means that the driver has to perform an action consciously or unconsciously after starting the authentication. The defined action can for example be an activation or an operation of the coupling, the turning signal, a touching of the steering wheel, particularly at a defined position, the occupation of the sitting position on the front seat, a conscious activation of a switch, an area, a button or the activation of the horn etc. Appropriately, the authentication starts with a conscious activation of an ignition switch and/or start-/stop switch assembled within the motor vehicle.

Further, it can be reasonable that the recognition device detects biological information of the driver as actual data during the authentication wherein the actual data comprise at least one of the following biological information: body height, iris, retina, facial geometry, finger print, structure of the hand lines, structure of the hand veins, geometry of the hand, nail bed pattern, ear shape, voice, signature, movement pattern performance for at least one defined movement of the driver, lip movement, body odor, DNA verification. Via a biometrical examination a high security and a high reliability during the authentication of the driver can be achieved. A combination of at least two biometric characteristics for a reliable authentication process is likewise possible, for example the combination of a facial recognition with the fingerprint. The facial recognition can for example occur via camera. The fingerprint detection can for example be performed via semi-conductor fingerprint sensors. For example strip sensors are possible across which the respective finger has to be moved.

The method according to the invention comprises that the recognition device stays deactivated until the external station transmits a reveille to the motor vehicle. This means that it can be determined from the external station which motor vehicle can be started at which point of time at all.

Advantageously, an authentication can only start when a second defined action of the driver is available, particularly, the second defined action can be recognized by a vehicle related sensor. The second defined action can for example be an actuation of the coupling, the turning light, touching of the steering wheel, particularly, at a defined position, the occupation of a seating position on the front seat, a conscious activation of a switch, an area, a button, the actuation of the horn etc. By a use of the second defined action of the driver an increased security and reliability of the method can be created. For example, it is possible that the sensor is a seat sensor or door sensor or a pedal sensor or a gear lever sensor or a sensor for recognition of a mobile identification device which the user is carrying on. It can be likewise intended that the sensor is a safety belt sensor. This means only when the driver sits on the front seat or the vehicle door is closed or a corresponding pedal is activated or the gear lever has a defined position or is turned into defined position or the safety belt is correctly applied the authentication process can be started by a first defined action of the driver particularly by an actuation of the ignition switch and/or the start-/stop switch. Likewise, it can be intended that initially an identification verification between the mobile identification device which is carried on by the vehicle holder or driver and the vehicle occurs wherein in a positive identification verification that first defined action of the driver can trigger a starting process of the authentication.

Advantageously, the recognition device can comprise a camera for detecting the actual data. For example the camera can be a CCD-camera which can also record and detect body movements or body posture of the driver.

Further, the object is served by a system for authentication of a driver in a motor vehicle with a recognition device assembled within the vehicle for detecting actual data of the driver transmitted to a tracking device during the authentication which is assembled in an external station outside the motor vehicle wherein the reviewing device compares the actual data with the target data and with a conformity of the actual data with the target data an enabling signal from the external station is send from the external station to the motor vehicle whereby an ignition process of the motor vehicle is enabled for the driver. The recognition device can be assembled as an electronic box within the motor vehicle. Further, the motor vehicle can be retrofitted with this box. Particularly, this system can be an advantage for rental car agencies, fleet vehicles of companies or even for insurances for which the information is important to and/or how often the motor vehicle is used or driven by a respective person. Particularly, regarding the insurance fee for a respective motor vehicle it can be intended according to the invention that the system individually informs the external station how often which driver drives the respective vehicle.

Likewise, it is possible that a second reviewing device is assembled within the vehicle in which the target data are saved. These target data are transmitted from the external station to the motor vehicle. In case for example a communication between the external station and the motor vehicle is impossible a verification of the actual data with the target data occurs in the second reviewing device. In case the actual data comply with the target data in the second reviewing device an enabling signal for the motor vehicle is generated which receives the enabling signal wherein an ignition process of the motor vehicle is enabled for the driver. Without enabling signal the driver cannot start the ignition process within the vehicle since this process is blocked or deactivated. Only with a positive authentication meaning a conformity of the actual data with the target data the ignition process is enabled. Advantageously, the actual data are biometrical actual data of the driver.

According to the invention it is possible that in case of a communication disorder between the external station and the motor vehicle the second reviewing device receives the actual data from the external station and compares the actual data with the target data and with the conformity of the actual data with the target data an enabling signal is generated wherein an ignition process of the motor vehicle is enabled for the driver. Further, the invention comprises that the target data are transmitted to the reviewing device of the external station in regular time intervals to the second reviewing device particularly doing the authentication of the target data of the reviewing device of the external station are transferred to the second reviewing device. Therewith, a frequent comparison of the target data between the reviewing device of the external station and the vehicle related reviewing device occurs.

Advantageous embodiments of the system are specified in the dependent claims.

Advantageously, the motor vehicle can comprise a communication means in order to receive or send actual data and an enabling signal wherein the external station comprises a communication means in order to receive and/or send actual data and an enabling signal. The communication means of the motor vehicle and the communication means of the external station can be configured as a sending and/or receiving unit. The communication between the communication means can preferably occur encrypted. The communication means of the motor vehicle can be integrated in the recognition device. The communication means can be fixed within the motor vehicle. Likewise, it is possible within the scope of the invention that the vehicle related communication means is mobile, for example that the communication means is a cellular phone which the user can carry on. Further, the invention comprises that with a communication disorder between the permanently installed communication means of the motor vehicle and the external station the cellular phone can be started as a "substitute" in order to establish the communication between the external station and the motor vehicle.

Advantageously, the actual data are biometrical actual data of a potential driver.

A further possibility is to integrate the control in the recognition device wherein the control can be brought into signal connection with the engine control. The control decides among others when the authentication is started. Hereby, it is possible that starting from at least a first defined action of the driver the authentication starts. Likewise, it is possible that at least two defined actions of the driver are necessary in order that the authentication starts. This is recognized by the control which can also be located or assembled outside the recognition device in another embodiment, particularly, integrated in the engine of the motor vehicle.

According to the invention a further possibility results in that the external station is in connection with the data base and/or a memory in which target data are dropped or secured. For this purpose, it can be an advantage that the external station comprises a reading device for reading in the biometrical target data like with the recognition device for reading in the biometrical actual data corresponding equipment, apparatus, like for example camera, etc. possible that the read in device of the external station can reliably detect biometric target data. In a possible embodiment of the invention it is possible that initially the driver is in the external station in which its target data particularly biometrical target data are recognized by the reading device. These target data are saved in the data base. The reviewing device of the external station accesses the data base during the authentication in order to compare the actual data of the driver with the target data or to check for conformity. In case for example the external station is a rental car agency the driver can approach the motor vehicle after the target data are recognized by the external station. In case the driver has unlocked the motor vehicle, has opened the door and subsequently sits down on the front seat, the authentication according to the described method according to the invention can start. This means that the determined actual data are initially detected by the recognition device assembled within the motor vehicle subsequently they are send to the external station which performs a corresponding verification in how far the actual data comply with the target data. With this conformity of the data the motor vehicle receives a corresponding enabling signal from the external station such that the motor vehicle can be started by the driver.

Advantageously, the external station is the Internet. Therewith, it is possible that the reviewing device can be assembled decentralized in order to secure all motor vehicles or to perform an authentication process with all drivers of different motor vehicles. Hereby, it can be an advantage that a plurality of read in devices exists which can detect target data which in turn can be transmitted by a corresponding communication means for example via radio and/or via the Internet to the external station particularly to the reviewing device. The central reviewing device can perform a comparison of the actual data received by the motor vehicle and the corresponding target data.

In order to create an improved security the recognition device can be assembled within the motor vehicle in a way that only a detection of actual data is possible from the front seat of the motor vehicle. Therewith, it is avoided that a read in of the actual data of another person within the motor vehicle occurs. The purpose of this embodiment is that it can be effectively avoided that a non-authorized driver can start the motor vehicle wherein at the same time the actual authorized driver is within the motor vehicle and the "correct" actual data are read into the recognition device. For example, it is possible that in the vicinity of the motor vehicle steering wheel and/or the armature in the vicinity of the motor vehicle steering wheel or at a defined position of the driver of the front seat which is not accessible for the co-driver the recognition device is assembled. Further, it is possible within the scope of the invention that the cellular phone which is carried on by the user serves as a recognition device for actual data.

In a possible embodiment of the invention the recognition device can be fixed within the motor vehicle wherein the recognition device can take over the function of a communication device for example that at the same time for example a "telephone call" with the recognition device is possible at the same time. The recognition device can comprise a communication module with a mobile communication module for the formation of a communication connection via the cellular phone network. Further, this communication connection can be used for said authentication which means that via the communication connection the authentication request between the external station and the motor vehicle can be performed.

Likewise, it is possible that the recognition device is mobile within the motor vehicle. Hereby, it can be intended that the recognition device is a telephone device, particularly, a cellular phone which can communicate with an own communication means with the reviewing device.

In a further embodiment of the invention the actual data can be assembled via a credit card, EC-card, a passport, an ID card or a driver's license of the driver. Particularly, it is possible that the recognition device reads in defined areas of the ID card and that these actual data are subsequently transmitted to the reviewing device.

Figure 2:
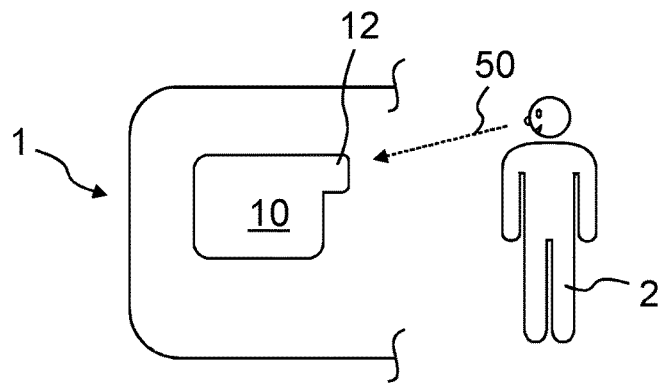
Figure 3:
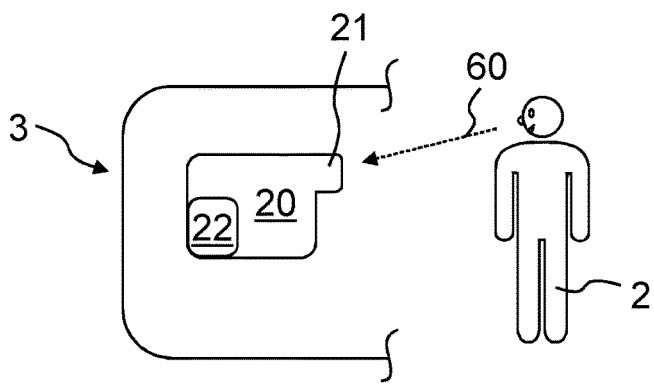
Figure 4:
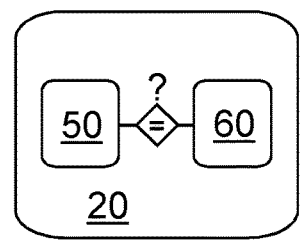
Figure 5:
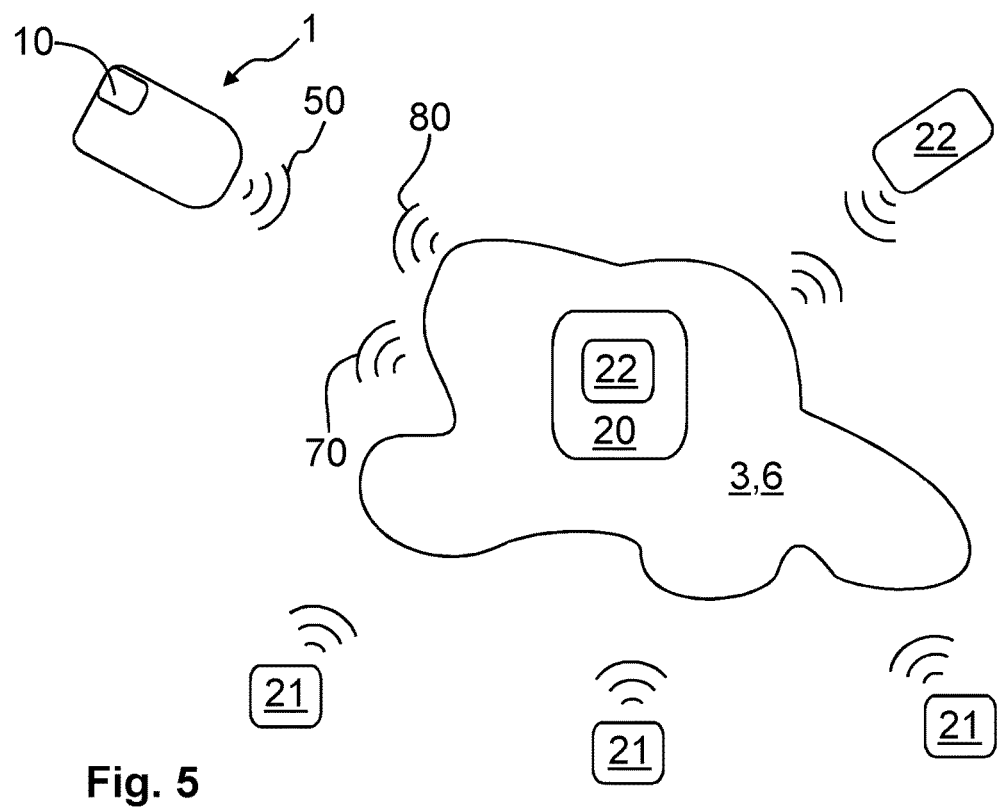
Figure 6:
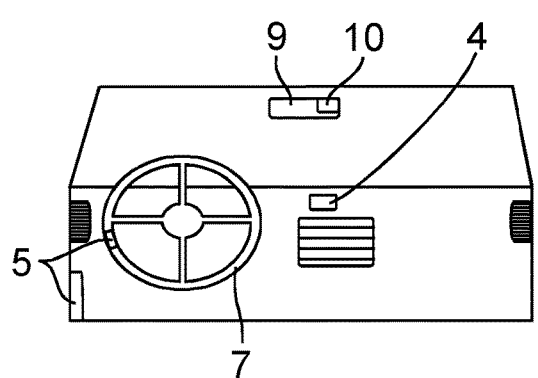
Figure 7:
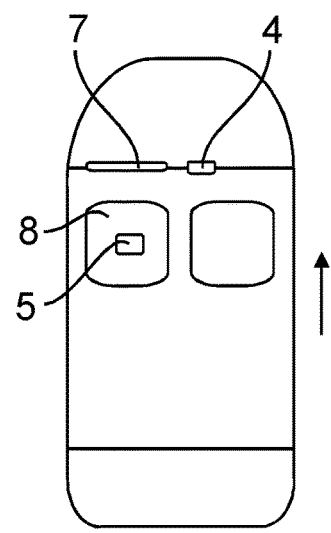
Figure 8:
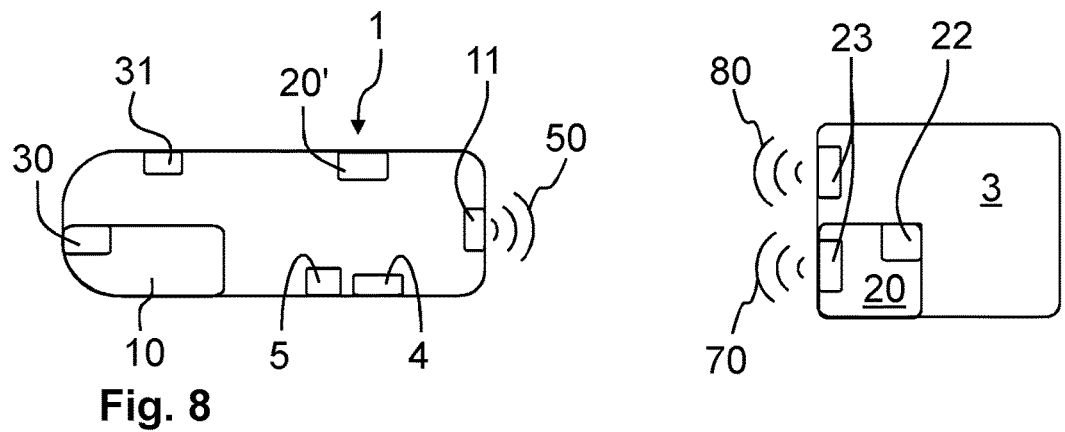
Figure 9:
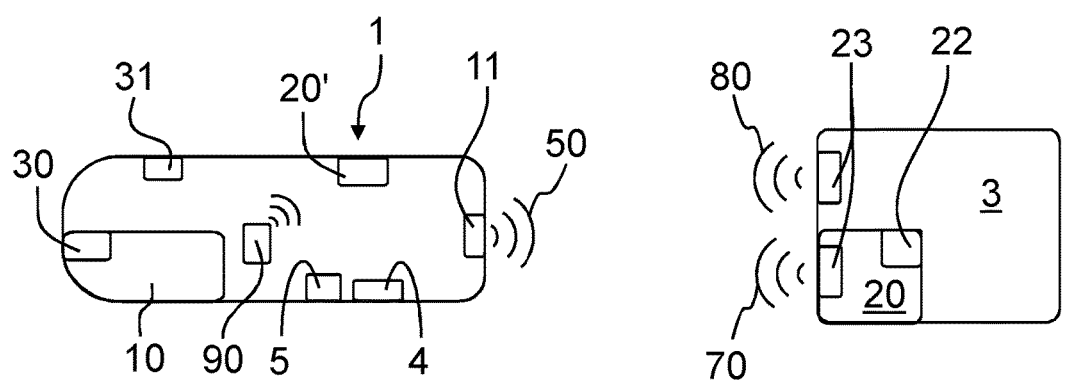

Further, advantageous features and details of the invention result from the subsequent description in which multiple possible embodiments of the invention are described in detail with relation to the drawings. Thereby, the features described in the claims and the description can be essential for the invention each single for themselves on any combination. It is shown:

FIG. 1 a schematic view of a system according to the invention for the authentication of a driver in a motor vehicle with an external station which is in a signal connection to the recognition device of the motor vehicle, FIG. 2 a further embodiment of the recognition device according to FIG. 1, FIG. 3 a further embodiment of a reviewing device which can be used in an external station according to FIG. 1, FIG. 4 a further embodiment of a reviewing device, FIG. 5 a further embodiment of a system for authentication of a driver in a motor vehicle, FIG. 6 a further embodiment of a system according to the invention, FIG. 7 a further alternative of said system for authentication of a driver in a motor vehicle, FIG. 8 a further embodiment of a system according to the invention and FIG. 9 a further embodiment of a system for authentication of a driver in a motor vehicle.

In FIG. 1 a motor vehicle 1 is schematically shown in which a not shown driver can be situated. Since the driver is situated within the motor vehicle 1 a detection of actual data 50 of the driver can occur via a recognition device 10. When the actual data 50 are detected a transmission of these actual data 50 to a spaced apart external station 3 are transmitted via a communication means 11 within the motor vehicle 1. In this external station 3 the actual data 50 are detected by a communication means 23. Further, the external station 3 comprises a reviewing device 20 which can compare the received actual data 50 with the target data 60 by a communication means 23 which is schematically shown in FIG. 4.

The target data 60 were previously, which means right before the authentication, read in via a memorizing device 21 wherein the memorizing device 1 determined data from the driver 2. In the present embodiments the target data 60 and the actual data 50 of the driver are biometrical actual data 50 and biometrical target data 60.

For example, it is possible that the driver 2 stayed within the external station 3 in which the memorizing device 21 detected the corresponding biometrical target data 60. Likewise, it is possible that the memorizing device 21 is assembled separated from the external station 3 like it is shown in FIG. 5. Since the biometrical target data 60 are detected by the memorizing device 21 it is possible that these biometrical target data 60 are transmitted to an external station 3 spaced apart from the memorizing device 21. Within the external station 3 a reviewing device 20 is assembled which performs a corresponding checking or comparison of the actual data 50 with the target data 60. In case a conformity of the data occurs the external station 3 transmits an enabling signal 70 to the motor vehicle 1 according to FIG. 1 and FIGS. 5, 8 and 9. The enabling signal 70 which can be received by a communication means 11 of the motor vehicle 1 enables that via defined action of the driver the ignition process of the motor vehicle can be released. The defined action of the driver can for example be that the driver actuates the ignitions switch and/or the start-/stop-switch 4 within the motor vehicle 1. Advantageously, the conscious activation of the driver triggers the start of said authentication process and by a positive authentication the ignition process of the motor vehicle 1.

According to FIG. 8 the motor vehicle 1 comprises a second reviewing device 20'. In case a communication disorder occurs between the external station 3 and the motor vehicle 1 the second reviewing device 20' receives the actual data 50 from the external station 3 wherein in the second reviewing device 20' the actual data are compared to the target data 60 and by a conformity of the actual data 50 with the target data 60 an enabling signal 70 is generated wherein an ignition process of the motor vehicle 1 is enabled for the driver 2.

Further, it is possible that the target data 60 of the reviewing device 20 of the external station 3 are transmitted in regular time intervals to the vehicle related reviewing device 20'. Hereby, a transmission of the target data 60 of the reviewing device 20 of the external station 3 to the second reviewing device 20' occurs preferably during the authentication.

According to FIG. 1, FIG. 3 and FIG. 5, 8, 9 a memory 22 or a data base can be intended which can save the biometric target data 60. This memory data base 22 can for example be integrated in a reviewing device 20, 20'. Likewise, it is possible that the reviewing device 20, 20' has to communicate with an external data base or with an external memory 22 in order to receive the target data 60 for the verification of the actual data 50. This alternative is likewise shown in FIG. 5.

The sending of the actual data 50, the target data 60 and the enabling signal 70 can occur encrypted. The recognition device 10 and the memorizing device 21 can for example comprise an optical or acoustical recognition element in order to collect or detect the biometrical characteristics of the driver 2. For example, it is possible that the camera 12 is intended in order to detect defined biometrical values or information of the driver 2 which is schematically shown in FIG. 2.

Likewise, the recognition device 10 an inexplicitly shown memory can be intended in FIG. 2 which briefly saves the actual data 50 which are subsequently transmitted to the external station 3.

As long as no conformity of the to be compared data 50, 60 is available the motor vehicle 1 is in a safety mode according to FIG. 1 and FIG. 5, 8, 9 in which the ignition of the motor vehicle 1 is blocked. This means that for example the ignition control of the motor vehicle 1 is deactivated. Only with a conformity of the to be compared data 50, 60 a change of the motor vehicle 1 in an ignition mode occurs such that the motor vehicle engine can be started.

In FIG. 1 it is shown that a control 30 can be intended in the recognition device 10 which can start said authentication starting from the a defined action of the driver 2. After receipt of an enabling signal 70 the control 30, for example the engine control 31 of the motor vehicle 1, can send a corresponding signal such that the motor vehicle 1 can be changed from the safety mode into the ignition mode. Likewise, it is possible that the engine control 31 completely takes over the function of the control 30 such that the control 30 can be waived in the recognition device 10.

According to FIG. 1, 8, 9 it is shown that via an actuation of the ignition switch 4 the process of authentication can be started. According to FIG. 6 and FIG. 7 it can be intended that for starting the authentication a second defined action of the driver 2 has to exist in order to start said authentication. According to FIGS. 1 and 6, 8, 9 it is for example possible that the driver 2 has to touch the steering wheel 7 beneath the activation of the ignition switch 4 which can alternatively be a start-/stop-switch. Within the steering wheel 7 a sensor 5 is intended which can detect the second defined action of the driver 2. Only in case two actions of the driver 2 are performed the authentication process starts. The recognition device 10 can for example be integrated in the rear mirror 9 which detects the actual data 50 of the driver 2. In order to possibly exclude manipulations the sensor 5 can be assembled lateral at the steering wheel 7 such that the co-driver cannot actuate the sensor 5.

FIG. 7 shows a further embodiment by which the sensor 5 is integrated in the front seat 8. Only when the ignition switch 4 and the sensor 5 detect the driver the authentication process starts. The actual data 50 according to FIG. 7 can, like in FIG. 6, be detected via the recognition device 10 which is integrated in the rear mirror 9. Naturally, alternative technologies like previously described are also possible in order to detect biometrically actual data 50 of the driver 2.

According to FIG. 1 and FIG. 5, 8, 9 it is possible that the recognition device 10 is deactivated within the motor vehicle 1 until a corresponding reveille 80 is send from the external station 3 in the direction of the motor vehicle 1. This received reveille 80 from the motor vehicle 1 affects that the recognition device 10 is turned from its deactivated state into an activated state in order to activate the recognition device 10 via one or multiple defined actions of the driver 2 in order to detect biometrically actual data 50 of the driver 2. According to FIG. 5 it is further possible that the external station 3 is integrated in the Internet 6 such that data 50, 60, 70, 80 can be transmitted within the Internet 6 or at least partly within the Internet 6 and via radio. The data base or the memory 22 can be located on a server connected to the Internet 6.

The communication means 23 of the external station 3 can be assembled in the reviewing device 20, 20' or in the memorizing device 21. Hereby, it is possible that the memorizing device 21 is integrated in the reviewing device 20, 20' which is for example shown in FIG. 3. In FIG. 5, however, the memorizing device 21 is separated from the reviewing device 20, 20'.

Advantageously, the authentication occurs uniquely prior to usual ignition process of the motor vehicle 1. Likewise, it can be intended that according to all Figures in regular time intervals or irregular time intervals during the drive automatically an authentication according to the described embodiments is performed according to all Figures. In case surprisingly a positive authentication is not confirmed by the reviewing device of the external station 3 a signal can for example be released which informs further persons. Likewise, it is possible that the corresponding signal is send from the external station 3 to the motor vehicle 1 particularly to the control 30 or the engine control 31. For example, it is possible that hereby the control 30, 31 informs the driver 2 via an acoustic or visual signal that no positive authentication is available. Likewise, the invention comprises that the driver 2 is forced by the engine control 31 to stop the motor vehicle or stop the control 30 or the engine control 31 and arrange a stop of the motor vehicle engine. With the last-mentioned embodiment it can be meaningful that previous to a stop of the motor vehicle engine the driver 2 receives an information namely that a stop will occur shortly by the engine control 31 or the control 30 said that the driver 2 has enough time to reduce the motor vehicle speed and to independently park the motor vehicle 1 and switch off the engine.

In a possible embodiment of the invention the recognition device 10 can be fixed within the motor vehicle 1. Alternatively, it is likewise possible that the recognition device 10 is mobile within the motor vehicle 1. Hereby, it can be intended that the recognition device 10 is a cellular phone 90 which can communicate with an own communication means with the reviewing device 20, 20' (s. FIG. 9).

In a further embodiment of the invention the actual data 50 can be assembled via a credit card, EC-card, passport, ID card or driver's license of the driver. Particularly, it is possible that the recognition device 10 reads in defined areas of the ID card and that these actual data 50 are subsequently transmitted to the reviewing device 20.

For example, the recognition device 10 can be configured as a cellular phone 10, 90 according to FIG. 1 or FIG. 2 and FIG. 9 which is moveably and assembled within the motor vehicle 1 via a camera 12 assembled at the cellular phone 10, 90 for example biometrical data of the user 2 can be detected. The cellular phone 10, 90 can comprise its own communication means which corresponds to the communication means 11 from FIG. 1 in order to transmit the actual data 50 to the external station 3. All embodiments according to FIGS. 1 to 7 can also be used with a cellular phone 10, 90 as a recognition device.

REFERENCE LIST 1 motor vehicle
2 driver
3 external station
4 ignition switch
5 sensor
6 Internet
7 steering wheel
8 seat
9 rear mirror
10 recognition device, cellular phone
11 communications means
12 camera
20 reviewing device
21 memorizing device
22 memory, data base
23 communication means
30 control
31 engine control
50 actual data
60 target data
70 enabling signal
80 reveille
90 cellular phone

The invention claimed is:

1. A method for authentication of a driver in a motor vehicle, the method comprising:
   detecting actual data of the driver with a mobile and/or retrofittable recognition device arranged within the motor vehicle;
   transmitting the actual data to a reviewing device assembled in an external station outside the motor vehicle during the authentication;
   comparing, using the reviewing device, the actual data with target data;
   with a conformity of the actual data with the target data, sending an enabling signal from the external station to the motor vehicle; and
   receiving the enabling signal at the motor vehicle, wherein, as a result of receiving the enabling signal, an ignition process of the motor vehicle is enabled for the driver,
   wherein the motor vehicle comprises a second reviewing device, which receives the target data of the external station and, with a conformity of the actual data with the target data, the second reviewing device sends a second enabling signal to the motor vehicle to enable the ignition process of the motor vehicle; and
   wherein the motor vehicle comprises a control, which initiates the authentication starting from at least one defined action of the driver, wherein the defined action of the driver is selected from the group consisting of activation of a turning signal, touching a steering wheel at a defined position, occupation of a sitting position on a front seat in the motor vehicle, activation of a button, and activation of a horn.

2. The method according to claim 1,
wherein,
the target data are read in to the external station previous to the authentication.

3. The method according to claim 2,
wherein,
a memorizing device detects the target data of the driver outside the motor vehicle, wherein the target data are saved in the external station.

4. The method according to claim 1,
wherein,
as long as no conformity of the actual data with the target data occurs, the motor vehicle is in a safety mode in which an ignition of the motor vehicle is blocked, wherein with a conformity of the actual data with the target data, the motor vehicle is in an ignition mode.

5. The method according to claim 1,
wherein,
during a conscious activation of an ignition switch assembled within the motor vehicle, the authentication starts.

6. The method according to claim 1,
wherein,
the actual data are biometric actual data.

7. The method according to claim 1,
wherein,
the recognition device recognizes biological information of the driver as actual data during the authentication, wherein the actual data comprise at least one characteristics of the following biological information:
body height, iris, retina, face geometry, finger print, hand line structure, hand vein structure, hand geometry, nailbed pattern, ear shape, voice, signature, movement pattern performance for at least one defined movement of the driver, lip movement.

8. The method according to claim 1,
wherein,
a first authentication only starts when a second defined action of the driver exists.

9. The method according to claim 8,
wherein,
the second defined action is recognized by a vehicle related sensor.

10. The method according to claim 9,
wherein,
the sensor is a seat sensor or a door sensor or a pedal sensor or a gear lever sensor or a sensor for recognition of a mobile identification device that is carried on by the driver.

11. The method according to claim 1,
wherein,
the second reviewing device receives the target data from the external station and compares the actual data with the target data, and the second enabling signal is generated with a conformity of the actual data with the target data, wherein the ignition process of the motor vehicle is enabled for the driver.

12. The method according to claim 1,
wherein,
the target data of the reviewing device of the external station are transmitted in regular time intervals to the second reviewing device.

13. The method according to claim 12,
wherein,
the target data of the reviewing device of the external station are transmitted to the second reviewing device during the authentication.

14. The method according to claim 1,
wherein,
the recognition device comprises a camera for the detection of the actual data.

15. The method according to claim 1, wherein the recognition device is assembled within the motor vehicle in a way that the detecting of the actual data is at a defined position of the driver on a front seat in the vicinity of a steering wheel of the motor vehicle.

16. The method according to claim 1, wherein the recognition device is assembled as a retrofittable electronic box within the motor vehicle.

17. The method according to claim 1, wherein the recognition device is configured as a mobile device.

18. The method according to claim 17, wherein the mobile device is a cellular phone.

19. A system for authentication of a driver in a motor vehicle, comprising:
a mobile and/or retrofittable recognition device;
a reviewing device; and
a second reviewing device,
wherein the motor vehicle comprises the mobile and/or retrofittable recognition device arranged within the motor vehicle for detection of actual data of the driver, wherein the actual data are sent to the reviewing device, which is assembled in an external station outside the motor vehicle during the authentication,
wherein the reviewing device compares the actual data with the target data and, with a conformity of the actual data with the target data, an enabling signal is sent from the external station to the motor vehicle, wherein the enabling signal is received at the motor vehicle, and as a result of receiving the enabling signal, an ignition process of the motor vehicle is enabled for the driver, and
wherein the motor vehicle comprises the second reviewing device, which receives the target data of the external station and, with a conformity of the actual data with the target data, the second reviewing device sends a second enabling signal to the motor vehicle to enable the ignition process of the motor vehicle; and
wherein the motor vehicle comprises a control, which initiates the authentication starting from at least one defined action of the driver, wherein the defined action of the driver is selected from the group consisting of activation of a turning signal, touching a steering wheel at a defined position, occupation of a sitting position on a front seat in the motor vehicle, activation of a button, and activation of a horn.

20. The system according to claim 19,
wherein,
the motor vehicle comprises a transmitter in order to at least send the actual data,
the motor vehicle comprises a receiver in order to at least receive the target data and the enabling signal,
the external station comprises a transmitter in order to at least send the target data and the enabling signal, and
the external station comprises a receiver in order to at least receive the actual data.

21. The system according to claim 19,
wherein,
the external station uses the Internet.

22. The system according to claim 19,
wherein,
the recognition device is assembled within the motor vehicle in a way that a detection of actual data is from a front seat of the motor vehicle.

23. The system according to claim 19,
wherein,
the recognition device comprises a transmitter and/or receiver for the establishment of a communication connection via a mobile telephone network.

24. The system according to claim 23,
wherein,
the recognition device is at least mobile or removable from the motor vehicle.

25. The system according to claim 19,
wherein,
the second reviewing device receives the target data from the external station and compares the actual data with the target data and, with a conformity of the actual data with the target data, the second enabling signal is generated, wherein the ignition process of the motor vehicle is enabled for the driver.

* * * * *